United States Patent
Chen et al.

(10) Patent No.: US 11,645,983 B2
(45) Date of Patent: May 9, 2023

(54) BOOSTER CIRCUIT AND DRIVING METHOD THEREOF, BACKLIGHT MODULE AND DISPLAY DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Yanwu Chen, Beijing (CN); Bo Xu, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

(*) Notice: Subject to any disclaimer, the term of this patent is extended or adjusted under 35 U.S.C. 154(b) by 232 days.

(21) Appl. No.: 16/757,963

(22) PCT Filed: Oct. 11, 2019

(86) PCT No.: PCT/CN2019/110609
§ 371 (c)(1),
(2) Date: Apr. 21, 2020

(87) PCT Pub. No.: WO2020/083040
PCT Pub. Date: Apr. 30, 2020

(65) Prior Publication Data
US 2021/0225296 A1  Jul. 22, 2021

(30) Foreign Application Priority Data
Oct. 26, 2018 (CN) .................. 201811257786.X

(51) Int. Cl.
*G09G 3/34* (2006.01)
*H02M 1/14* (2006.01)
(Continued)

(52) U.S. Cl.
CPC ............ *G09G 3/3406* (2013.01); *H02M 1/14* (2013.01); *H02M 1/44* (2013.01); *H02M 3/157* (2013.01);
(Continued)

(58) Field of Classification Search
CPC ......... G09G 3/3406; G09G 2320/0626; G09G 2330/02; H05B 45/3725; H02M 1/14; H02M 3/157–158
See application file for complete search history.

(56) References Cited

U.S. PATENT DOCUMENTS 5,742,151 A * 4/1998 Hwang ............... H02M 1/4225
323/222
10,224,808 B2 * 3/2019 Torii ....................... H02M 1/14
(Continued)

FOREIGN PATENT DOCUMENTS

| CN | 1302113 A | 7/2001 | |
|---|---|---|---|
| CN | 201113817 Y * | 9/2008 | ............. Y02B 70/10 |

(Continued)

OTHER PUBLICATIONS

First Chinese Office Action dated Jun. 5, 2019, received for corresponding Chinese Application No. 201811257786.X, 20 pages.

*Primary Examiner* — Lin Li
(74) *Attorney, Agent, or Firm* — Kinney & Lange, P.A.

(57) ABSTRACT

The embodiments of the present application disclose a booster circuit and a driving method thereof, a backlight module and a display device. The booster circuit includes: a booster sub-circuit and an oscillation elimination sub-circuit; wherein the booster sub-circuit includes a power supply
(Continued)

element, an inductor, and a first switch; the booster sub-circuit is configured to provide, at a connection node, a voltage higher than a voltage provided from the power supply element; and wherein a parasitic capacitance occurs between the connection node and a ground terminal; the oscillation elimination sub-circuit is configured to prevent a current generated when the parasitic capacitance discharges from flowing through the inductor so as to eliminate an oscillation generated between the parasitic capacitance and the inductor.

5 Claims, 14 Drawing Sheets

(51) Int. Cl.
| | |
|---|---|
| *H02M 7/483* | (2007.01) |
| *H03M 1/46* | (2006.01) |
| *G03B 21/20* | (2006.01) |
| *H05B 45/3725* | (2020.01) |
| *H02M 1/44* | (2007.01) |
| *H02M 3/157* | (2006.01) |
| *H02M 3/158* | (2006.01) |

(52) U.S. Cl.
CPC ........ *H02M 3/158* (2013.01); *H05B 45/3725* (2020.01); *G09G 2320/0626* (2013.01); *G09G 2330/02* (2013.01)

(56) References Cited

U.S. PATENT DOCUMENTS

| | | | |
|---|---|---|---|
| 2001/0005322 A1 | 6/2001 | Uchida | |
| 2009/0009104 A1 | 1/2009 | Doi et al. | |
| 2014/0077714 A1* | 3/2014 | Suzuki | G03B 21/204 |
| | | | 315/226 |
| 2014/0232359 A1* | 8/2014 | Dash | H02M 3/158 |
| | | | 323/235 |
| 2017/0110068 A1* | 4/2017 | Lee | G09G 3/342 |
| 2020/0014395 A1* | 1/2020 | Chaput | H03M 1/462 |
| 2020/0076302 A1* | 3/2020 | Zhuang | H02M 7/4837 |

FOREIGN PATENT DOCUMENTS

| | | | | |
|---|---|---|---|---|
| CN | 101369774 A | | 2/2009 | |
| CN | 102437730 A | | 5/2012 | |
| CN | 203233572 U | * | 10/2013 | ............ Y02B 20/40 |
| CN | 106251812 A | * | 12/2016 | ............ G09G 3/34 |
| CN | 207352945 U | | 5/2018 | |
| CN | 109194129 A | | 1/2019 | |

* cited by examiner

BOOSTER CIRCUIT AND DRIVING METHOD THEREOF, BACKLIGHT MODULE AND DISPLAY DEVICE

CROSS-REFERENCE TO RELATED APPLICATION(S)

The present application is the national phase of PCT Application No. PCT/CN2019/110609 filed on Oct. 11, 2019, which claims priority to Chinese Patent Application No. 201811257786.X filed on Oct. 26, 2018, and entitled "Booster circuit and driving method thereof, backlight module and display device", the entire disclosure of which is incorporated herein by reference.

TECHNICAL FIELD

The embodiments of the present disclosure relate to the field of display technology, and in particular to a booster circuit and a driving method thereof, a backlight module, and a display device.

BACKGROUND

With the development of liquid crystal display panels, large-size liquid crystal display panels have gradually become the frontier of development. As the size of the liquid crystal display panel increases, it is necessary to provide more light bars in the backlight module as the backlight source to achieve the normal display brightness of the large-size liquid crystal display panel. As the number of light bars increases, a higher driving voltage is required to drive the light bars to emit light, which requires a booster circuit for boosting the voltage in the backlight module.

According to the inventor's research, when the booster circuit is operating in a discontinuous current mode (DCM), parasitic capacitance is generated. Oscillation between the parasitic capacitance and the inductor will cause greater electromagnetic interference, making the adverse effects caused by the electromagnetic interference greater.

SUMMARY

In a first aspect, an embodiment of the present disclosure provides a booster circuit, comprising a booster sub-circuit and an oscillation elimination sub-circuit.

The booster sub-circuit comprises a power supply element, an inductor, and a first switch; a first terminal of the power supply element is connected to a first terminal of the inductor, and a second terminal of the power supply element is connected to a ground terminal; a second terminal of the inductor is connected to the oscillation elimination sub-circuit, a first electrode of the first switch is connected to a connection node, a second electrode of the first switch is connected to the ground terminal, and the booster sub-circuit is configured to provide, at the connection node, a voltage higher than a voltage provided from the power supply element; and wherein a parasitic capacitance occurs between the connection node and the ground terminal.

The oscillation elimination sub-circuit is connected to the second terminal of the inductor and the connection node, and is configured to prevent a current generated when the parasitic capacitance discharges from flowing through the inductor so as to eliminate an oscillation generated between the parasitic capacitance and the inductor.

Alternatively, the booster sub-circuit further comprises: a second switch, an output capacitor and a load.

A control electrode of the first switch is connected to a first control terminal, a first electrode of the first switch is connected to the connection node, and a second electrode of the first switch is connected to the ground terminal.

A control electrode of the second switch is connected to a second control terminal, a first electrode of the second switch is connected to the connection node, and a second electrode of the second switch is connected to a first terminal of the output capacitor.

The first terminal of the output capacitor is connected to a first terminal of the load, and a second terminal of the output capacitor is connected to the ground terminal.

A second terminal of the load is connected to the ground terminal.

Alternatively, the oscillation elimination sub-circuit comprises: a NOR gate and a third switch.

A first input terminal of the NOR gate is connected to the first control terminal, a second input terminal of the NOR gate is connected to the second control terminal, and an output terminal of the NOR gate is connected to a control electrode of the third switch.

A first electrode of the third switch is connected to the second terminal of the inductor, and a second electrode of the third switch is connected to the connection node.

Alternatively, the third switch turns on when the first switch is turned on and/or the second switch is turned on.

Alternatively, the oscillation elimination sub-circuit comprises: a thyristor.

A gate of the thyristor is connected to a third control terminal, an anode of the thyristor is connected to the connection node and the second terminal of the inductor, and a cathode of the thyristor is connected to the first terminal of the inductor.

Alternatively, an input signal of the third control terminal turns the thyristor on when a falling edge of an input signal of the second control terminal is detected.

Alternatively, the first control terminal and the second control terminal are connected to a timing driving chip.

The timing driving chip is configured to provide the first control terminal with a signal for turning the first switch on or off, and also configured to provide the second control terminal with a signal for turning the second switch on or off.

Alternatively, the third control terminal is connected to the timing driving chip.

The timing driving chip is also configured to provide the third control terminal with a signal for turning the thyristor on or off.

In a second aspect, an embodiment of the present disclosure further provides a backlight module, comprising the booster circuit mentioned above.

In a third aspect, an embodiment of the present disclosure further provides a display device, comprising the backlight module mentioned above.

In a fourth aspect, an embodiment of the present disclosure further provides a driving method of the booster circuit mentioned above, the method comprising:

providing at the connection node, by the booster sub-circuit, a voltage higher than a voltage provided from the power supply element; and preventing, by the oscillation elimination sub-circuit, a current generated when the parasitic capacitance discharges from flowing through the inductor so as to eliminate an oscillation generated between the parasitic capacitance and the inductor.

Alternatively, the booster sub-circuit further comprises: a second switch, an output capacitor and a load, wherein, a control electrode of the first switch is connected to a first control terminal, a first electrode of the first switch is connected to the connection node, and a second electrode of the first switch is connected to the ground terminal; a control electrode of the second switch is connected to a second control terminal, a first electrode of the second switch is connected to the connection node, and a second electrode of the second switch is connected to a first terminal of the output capacitor; the first terminal of the output capacitor is connected to a first terminal of the load, and a second terminal of the output capacitor is connected to the ground terminal; a second terminal of the load is connected to the ground terminal; the oscillation elimination sub-circuit comprises: a NOR gate and a third switch; a first input terminal of the NOR gate is connected to the first control terminal, a second input terminal of the NOR gate is connected to the second control terminal, and an output terminal of the NOR gate is connected to a control electrode of the third switch.

A first electrode of the third switch is connected to the second terminal of the inductor, and a second electrode of the third switch is connected to the connection node.

The providing at the connection node, by the booster sub-circuit, a voltage higher than a voltage provided from the power supply element comprises:

providing the first control terminal with a signal for turning the first switch on, and providing the second control terminal with a signal for turning the second switch off at the same time, to turn the first switch and turn the second switch off, charging the inductor by the power supply element, and supplying power to the load by the output capacitor;

then, providing the first control terminal with a signal for turning the first switch off, and providing the second control terminal with a signal for turning the second switch on at the same time, to turn the first switch off and turn the second switch on, and supplying power to the load by the inductor;

the preventing, by the oscillation elimination sub-circuit, a current generated when the parasitic capacitance discharges from flowing through the inductor so as to eliminate an oscillation generated between the parasitic capacitance and the inductor comprises:

providing the first control terminal with a signal for turning the first switch off, and providing the second control terminal with a signal for turning the second switch off at the same time, to turn the first switch and the second switch off, and supplying power to the load by the output capacitor.

Alternatively, the booster sub-circuit further comprises: a second switch, an output capacitor and a load, and wherein a control electrode of the first switch is connected to a first control terminal, a first electrode of the first switch is connected to the connection node, and a second electrode of the first switch is connected to the ground terminal; a control electrode of the second switch is connected to a second control terminal, a first electrode of the second switch is connected to the connection node, and a second electrode of the second switch is connected to a first terminal of the output capacitor; the first terminal of the output capacitor is connected to a first terminal of the load, and a second terminal of the output capacitor is connected to the ground terminal; a second terminal of the load is connected to the ground terminal; the oscillation elimination sub-circuit comprises: a thyristor; and wherein a gate of the thyristor is connected to a third control terminal, an anode of the thyristor is connected to the connection node and the second terminal of the inductor, and a cathode of the thyristor is connected to the first terminal of the inductor.

The providing at the connection node, by the booster sub-circuit, a voltage higher than a voltage provided from the power supply element comprises:

providing the first control terminal with a signal for turning the first switch on, providing the second control terminal with a signal for turning the second switch off, to turn the first switch on and turn the second switch off, charging the inductor by the power supply element, and supplying power to the load by the output capacitor;

then, providing the first control terminal with a signal for turning the first switch off, providing the second control terminal with a signal for turning the second switch on, to turn the first switch off and turn the second switch on, and supplying power to the load by the inductor.

The preventing, by the oscillation elimination sub-circuit, a current generated when the parasitic capacitance discharges from flowing through the inductor so as to eliminate an oscillation generated between the parasitic capacitance and the inductor comprises:

providing the first control terminal with a signal for turning the first switch off, providing the second control terminal with a signal for turning the second switch off, and providing the third control terminal with a signal for turning the thyristor on at the same time, to turn the first switch and the second switch off and turn the thyristor on, supplying power to the load by the output capacitor, and discharging, by the parasitic capacitance, to the power supply component through the thyristor until the thyristor turns off;

then, providing the first control terminal with a signal for turning the first switch off, providing the second control terminal with a signal for turning the second switch off, to turn the first switch and the second switch off, and supplying power to the load by the output capacitor.

Other features and advantages of the embodiments of the present disclosure will be described in the subsequent description, and partly become obvious from the description, or be understood by implementing the embodiments of the present disclosure. The objects and other advantages of the embodiments of the present disclosure may be achieved and obtained by the structures specifically pointed out in the description, claims, and drawings.

BRIEF DESCRIPTION OF THE DRAWINGS

The drawings are used to provide a further understanding of the technical solutions of the embodiments of the present disclosure, and form a part of the specification, and are used to explain the technical solutions of the embodiments of the present disclosure together with the embodiments of the present disclosure, and do not constitute a limitation on the technical solutions of the embodiments of the present disclosure.

DETAILED DESCRIPTION

To make the objectives, technical solutions, and advantages of the embodiments of the present disclosure more clear, the embodiments of the present disclosure will be described in detail below with reference to the drawings. It should be noted that the embodiments in the present disclosure and the features in the embodiments may be arbitrarily combined with each other without conflict.

The steps shown in the flowcharts of the figures may be performed in a computer system such as a set of computer-executable instructions. And, although a logical order is shown in the flowchart, in some cases, the steps shown or described may be performed in an order different from here.

Unless otherwise defined, the technical terms or scientific terms disclosed in the embodiments of the present disclosure shall have the usual meanings understood by persons with general skills in the field to which the embodiments of the present disclosure belong. The words "first", "second" and similar words used in the embodiments of the present disclosure do not indicate any order, quantity or importance, but are only used to distinguish different components. Similar words such as "include" or "including" mean that the elements or objects appearing before the word cover the elements or objects listed after the word and their equivalents, but do not exclude other elements or objects. "Connected" or "connected to" and similar words are not limited to physical or mechanical connections, but may include electrical connections, whether direct or indirect.

In the embodiments of the present disclosure, in order to distinguish the two electrodes of the thin film transistor except the gate, one of the electrodes is called a first electrode, and the other electrode is called a second electrode. The first electrode may be a source or a drain, and the second electrode may be a drain or a source. In addition, the gate of the thin film transistor is called the control electrode.

Figure 1:
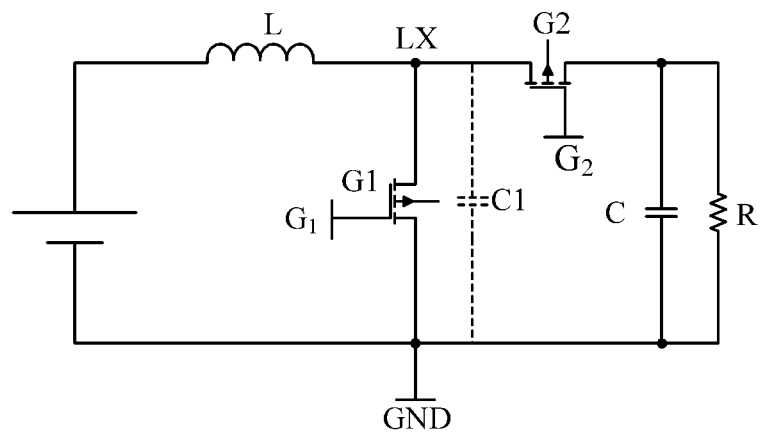
FIG. 1 is an equivalent circuit diagram of a booster circuit in the related art.

The booster circuit is a circuit that uses modern power electronics technology to control the ratio of the on and off time of the switch to maintain a stable output voltage. FIG. 1 is an equivalent circuit diagram of a booster circuit in the related art. As shown in FIG. 1, the booster circuit includes: a power supply, an inductor L, a first switch G1, a second switch G2, an output capacitor C, and a load R.

Figure 2:
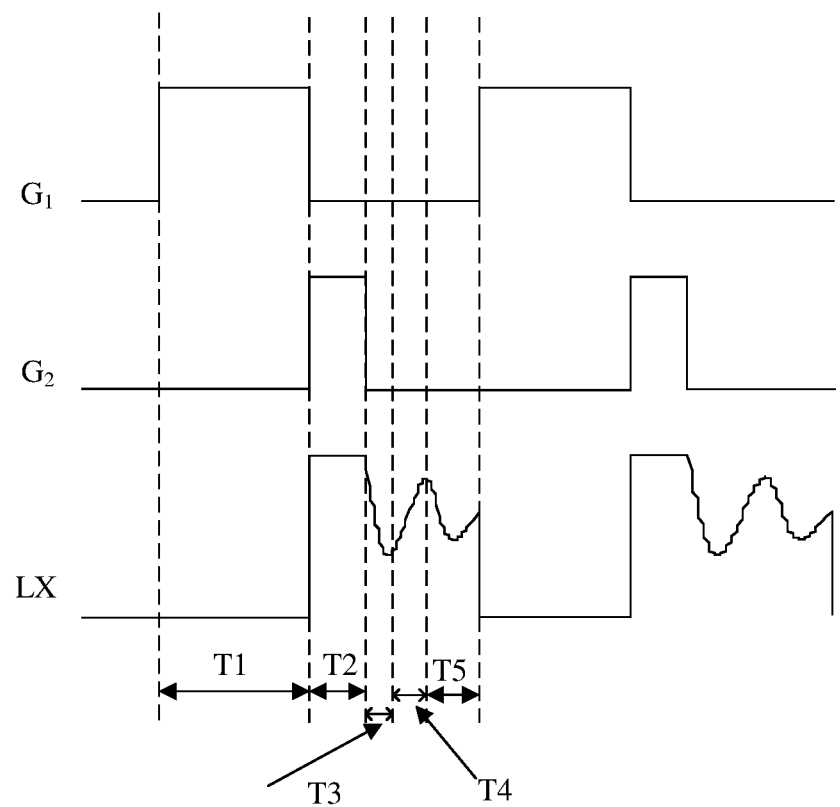
FIG. 2 is a timing diagram of the booster circuit in the related art.

FIG. 2 is a timing diagram of the booster circuit in the related art. As shown in FIG. 2, when the booster circuit operates in DCM, the operating principle of the booster circuit in the related art is as follows.

At the first stage t1, that is, the charging stage, the first switch G1 is turned on and the second switch G2 is turned off. The power supply charges the inductor L, and the load R is powered by the output capacitor C. The second switch G2 is used to prevent the output capacitor C from discharging to the ground terminal GND. At this time, the voltage at the node LX is 0V.

In this stage, the control terminal $G_1$ provides a control signal for turning the first switch G1 on, and the control terminal $G_2$ provides a control signal for turning the second switch G2 off.

At the second stage t2, that is, the discharge stage, the first switch G1 is turned off and the second switch G2 is turned on. The inductor L discharges via the second switch G2, the load R, and the output capacitor C. At this time, the voltage at the node LX is Vout.

In this stage, the control terminal $G_1$ provides a control signal for turning the first switch G1 off, and the control terminal $G_2$ provides a control signal for turning the second switch G2 on.

In addition, a parasitic capacitance C1 inevitably occurs between the node LX and the ground GND on the booster circuit in the related art generates due to the chip manufacturing process and the printed circuit board patterning. Due to the existence of the parasitic capacitance C1, the operating principle of the booster circuit in the related art further includes the following stages.

At the third stage t3, the first switch G1 is turned off, and the second switch G2 is turned off. Since the discharge of the inductor L completes at the end of the second stage t2, the voltage at the node LX is higher than the voltage provided from the power supply at this time, and the parasitic capacitance C1 discharges to the power supply through the inductor L. At this time, the inductor L is charged. The voltage at the node LX drops.

At the fourth stage t4, the first switch G1 is turned off, and the second switch G2 is turned off. Since the voltage difference across the parasitic capacitor C1 at the end of the third stage t3 is equal to the voltage provided from the power supply, the parasitic capacitor C1 can no longer release energy to the power supply. However, since the inductor L discharges at this time, the voltage at the node LX rises until the discharge of the inductor L completes.

At the fifth stage t5, the oscillation generated between the inductor L and the parasitic capacitance C1 reciprocates in this way until the first switch G1 is turned on again. At this time, the node LX is connected to the ground terminal GND, and the voltage at the node LX quickly drops to 0V. At this point, a periodic waveform of the node LX ends.

According to the above analysis and FIG. 2, it can be seen that in the booster circuit of the related art, an oscillation between the parasitic capacitance C1 and the inductor L happens when the parasitic capacitance C1 discharges, causing unnecessary oscillation ripples, thereby causing a large clutter of the signal waveform of the LX, and thereby generating electromagnetic interference. Electromagnetic interference will not only interfere with other signals, but may also cause the electromagnetic interference detection to fail, which has a large adverse effect on the liquid crystal display panel.

For this reason, the embodiments of the present disclosure provide a booster circuit and a driving method thereof, a backlight module, and a display device, which are specifically described as follows.

Figure 3:
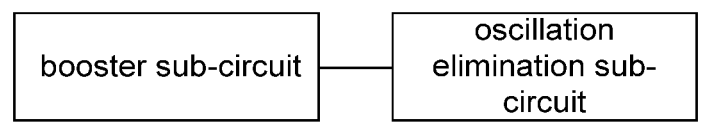
FIG. 3 is a schematic structural diagram of a booster circuit according to an embodiment of the present disclosure.

An embodiment of the present disclosure provides a booster circuit. FIG. 3 is a schematic structural diagram of the booster circuit according to the embodiment of the present disclosure. As shown in FIG. 3, the booster circuit according to the embodiment of the present disclosure includes a booster sub-circuit and an oscillation elimination sub-circuit.

The booster sub-circuit includes a power supply element, an inductor and a first switch. The first terminal of the power supply element is connected to the first terminal of the inductor, and the second terminal of the power supply element is connected to the ground terminal. The second terminal of the inductor is connected to the oscillation elimination sub-circuit. The first electrode of the first switch is connected to a connection node, and the second electrode of the first switch is connected to the ground terminal. The booster sub-circuit is configured to provide, at the connection node, a voltage higher than the voltage provided from the power supply element. A parasitic capacitance occurs between the connection node and the ground terminal. The oscillation elimination sub-circuit is connected to the second terminal of the inductor and the connection node, and is configured to prevent the current generated when the parasitic capacitance discharges from flowing through the inductor so as to eliminate the oscillation generated between the parasitic capacitance and the inductor.

It should be noted that the actual function of the booster sub-circuit is boosting, and the boosting process is an energy transfer process of an inductor. During charging, the inductor absorbs energy, and during discharge, the inductor emits energy. If the capacitance is large enough, a continuous current is maintained during the discharge. If the on-off process repeats continuously, a voltage higher than the power supply may be obtained across the capacitance.

In the embodiment of the present disclosure, by providing an oscillation elimination sub-circuit in the booster circuit, the current generated when the parasitic capacitance discharges can be prevented from flowing through the inductor, eliminating the oscillation between the parasitic capacitance and the inductor, and avoiding causing a large electromagnetic interference, thereby reducing adverse effects caused by the electromagnetic interference.

Figure 4:
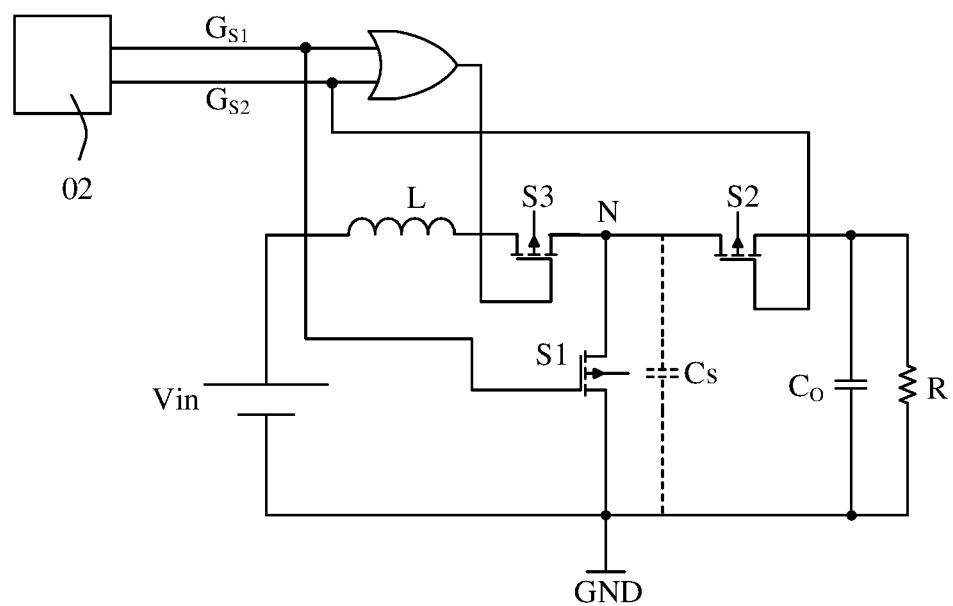
FIG. 4 is a first equivalent circuit diagram of a booster circuit according to an embodiment of the present disclosure.
Figure 5:
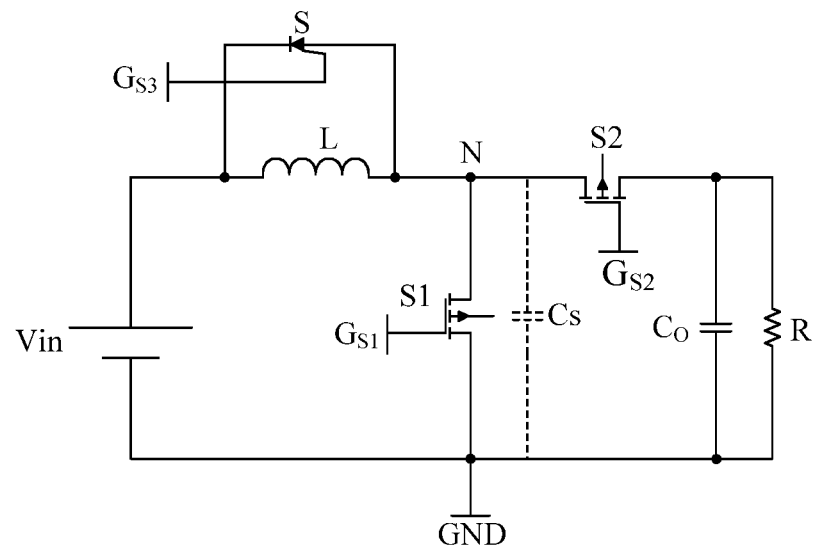
FIG. 5 is a second equivalent circuit diagram of a booster circuit according to an embodiment of the present disclosure.

Optionally, FIG. 4 is a first equivalent circuit diagram of a booster circuit according to an embodiment of the present disclosure, and FIG. 5 is a second equivalent circuit diagram of a booster circuit according to an embodiment of the present disclosure. As shown in FIGS. 4 and 5, the booster sub-circuit includes: a power supply element Vin, an inductor L, a first switch S1, a second switch S2, an output capacitor $C_O$, and a load R.

As shown in FIGS. 4 and 5, the connection relationship of the components of the booster sub-circuit is as follows. The first terminal of the power supply element Vin is connected to the first terminal of the inductor L, and the second terminal of the power supply element Vin is connected to the ground terminal GND. The second terminal of the inductor L is connected to the oscillation elimination sub-circuit. The control electrode of the first switch S1 is connected to the first control terminal $G_{S1}$, the first electrode of the first switch S1 is connected to a connection node N, and the second electrode of the first switch S1 is connected to the ground terminal GND. The control electrode of the second switch S2 is connected to the second control terminal $G_{S2}$, the first electrode of the second switch S2 is connected to the connection node N, and the second electrode of the second switch S2 is connected to the first terminal of the output capacitor $C_O$. The first terminal of the output capacitor $C_O$ is connected to the first terminal of the load R, and the second terminal of the output capacitor $C_O$ is connected to the ground terminal GND. The second terminal of the load R is connected to the ground terminal GND.

Optionally, the first switch S1 and the second switch S2 are thin film transistors. The thin film transistor may be a Metal-Oxide-Semiconductor Field-Effect Transistor, referred to as MOSFET.

Optionally, the load R is a light bar component in the backlight module, including at least one light-emitting diode, referred to as LED.

The voltage input by the power supply element Vin may specifically be a 24V voltage, etc., which is not limited in this embodiment of the present disclosure. Specifically, the power supply element Vin provides a DC signal, so the current in the inductor L increases linearly at a certain rate, which is related to the size of the inductor L. As the current in the inductor L increases, some energy is stored in the inductor L. The first terminal of the power supply element Vin represents a positive electrode, and the second terminal thereof represents a negative electrode.

Figure 16:
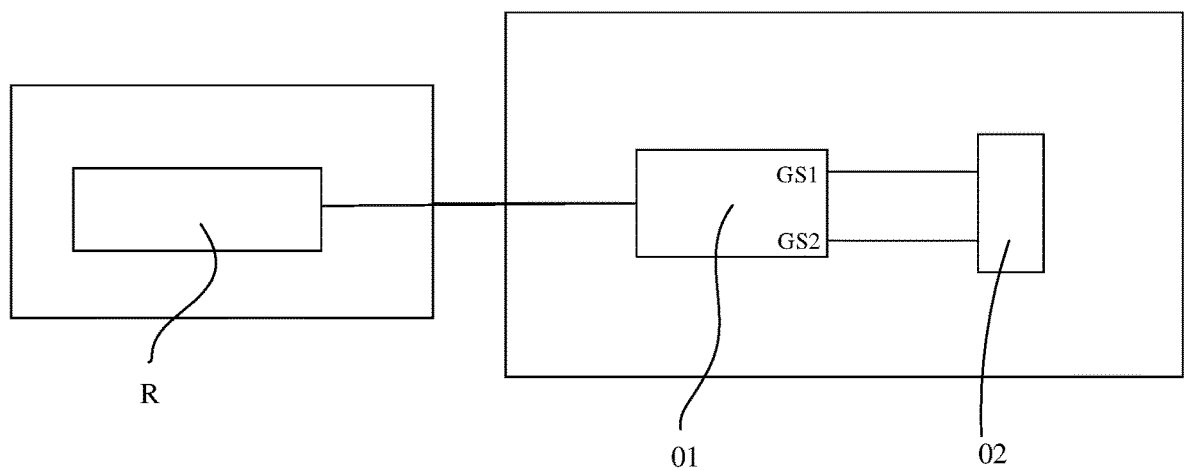
FIG. 16 shows a schematic circuit connection diagram of a booster circuit and a timing driving chip.

In the embodiment of the present disclosure, as shown in FIGS. 4 and 16 the booster circuit 02 is provided in the display device. The display device also includes a timing driving chip 02, which is connected to the first control terminal $G_{S1}$ and the second control terminal $G_{S2}$. The timing driving chip 02 is configured to provide the first control terminal $G_{S1}$ with a control signal for turning the first switch S1 on or off, and also configured to provide the second control terminal $G_{S2}$ with a control signal for turning the second switch S2 on or off.

Specifically, the timing driving chip 02 controls the on or off of the first switch or the second switch by outputting a high-level signal or a low-level signal.

Specifically, when both the first switch S1 and the second switch S2 are N-type transistors, the timing driving chip 02 may turn the first switch S1 and the second switch S2 on by outputting a high-level signal, and turn the first switch S1 and the second switch S2 off by outputting a low-level signal. When both the first switch S1 and the second switch S2 are P-type transistors, the timing driving chip 02 may turn the first switch S1 and the second switch S2 on by outputting a low-level signal, and turn the first switch S1 and the second switch S2 off by outputting a high-level signal. In specific cases, the transistor types of the first switch and the second switch may be designed according to the circuit design, and the on or off of the selected switch may be controlled by adjusting the output signal accordingly, which will not be repeated in the embodiments of the present disclosure.

Optionally, as an implementation of an embodiment of the present disclosure, FIG. 4 is an equivalent circuit diagram of a booster circuit according to an embodiment of the present disclosure. As shown in FIG. 4, the oscillation elimination sub-circuit includes a NOR gate and a third switch S3.

Optionally, the third switch S3 is a thin film transistor. The thin film transistor may be a Metal-Oxide-Semiconductor Field-Effect Transistor, referred to as MOSFET.

Optionally, the third switch S3 may be a P-type or N-type transistor, which is not limited in this embodiment of the present disclosure.

Each of the switches S1 to S3 in the booster circuit provided in FIG. 4 may be an N-type thin film transistor or a P-type thin film transistor. This can facilitate uniformity of the process flow, simplify the technological process, and help improve the yield of the product.

Specifically, as shown in FIG. 4, the first input terminal of the NOR gate is connected to the first control terminal $G_{S1}$, the second input terminal of the NOR gate is connected to the second control terminal $G_{S2}$, and the output terminal of the NOR gate is connected to the control electrode of the third switch S3. The first electrode of the third switch S3 is connected to the second terminal of the inductor L, and the second electrode of the third switch S3 is connected to the connection node N.

Specifically, when the input signal provided by the first control terminal $G_{S1}$ turns the first switch S1 on or the input signal provided by the second control terminal $G_{S2}$ turns the second switch S2 on, the third switch S3 turns on. That is, when any one of the first switch S1 and the second switch S2 is turned on, the third switch turns on.

The technical solution of the embodiment of the present disclosure is further described below in conjunction with the operating process of the booster circuit.

Figure 6A:
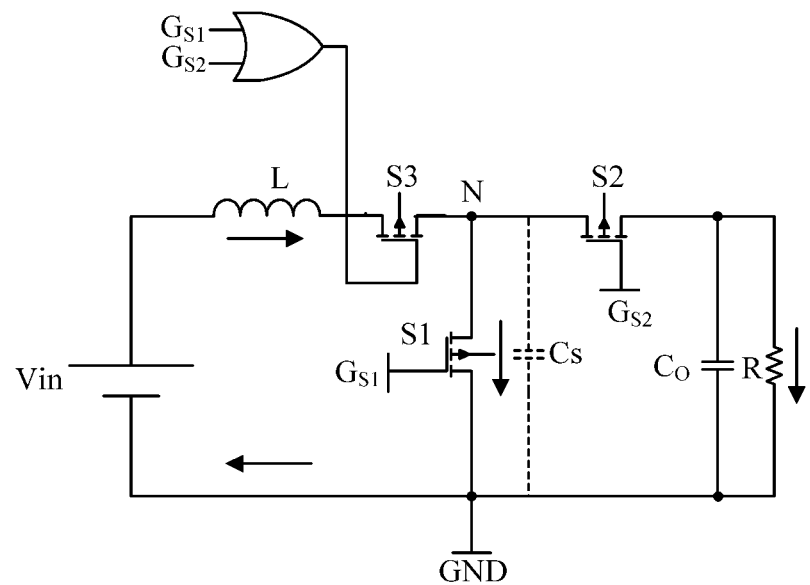
FIG. 6A is an operating state diagram of the first stage of the booster circuit provided in FIG. 4.
Figure 6B:
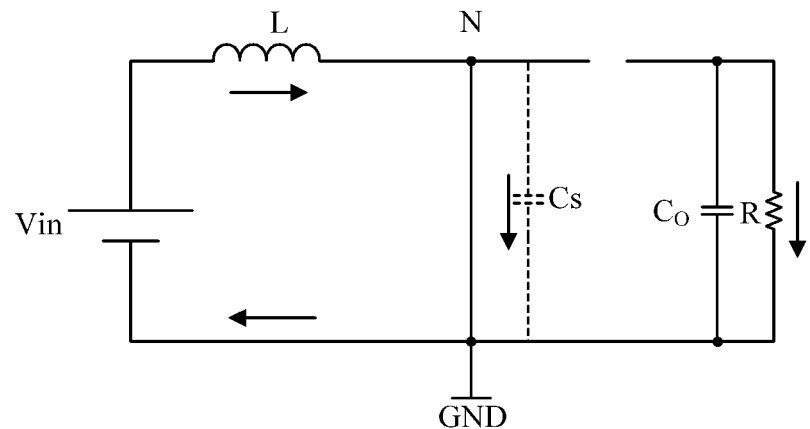
FIG. 6B is an equivalent circuit diagram corresponding to FIG. 6A.
Figure 7A:
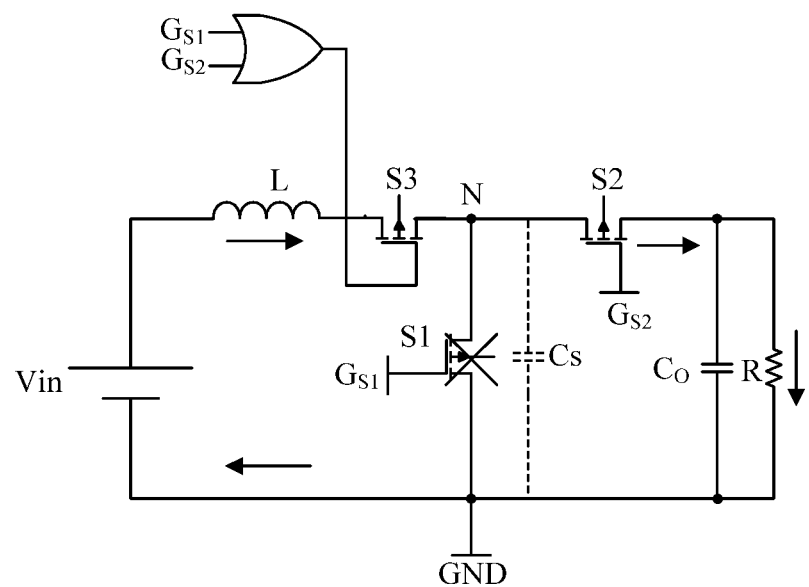
FIG. 7A is an operating state diagram of the second stage of the booster circuit provided in FIG. 4.
Figure 7B:
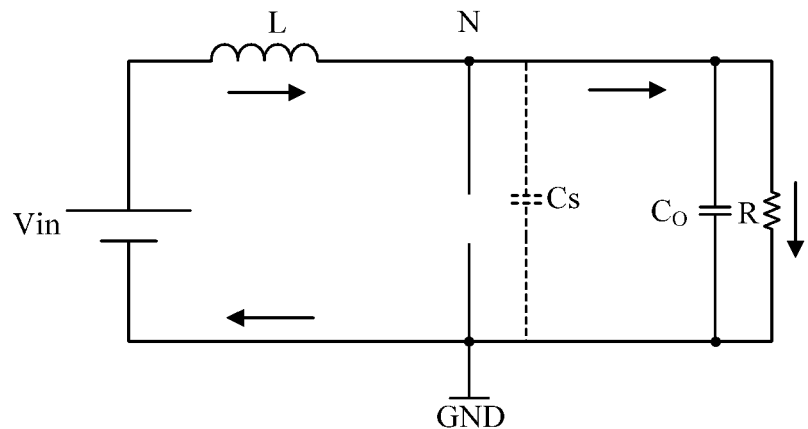
FIG. 7B is an equivalent circuit diagram corresponding to FIG. 7A.
Figure 8A:
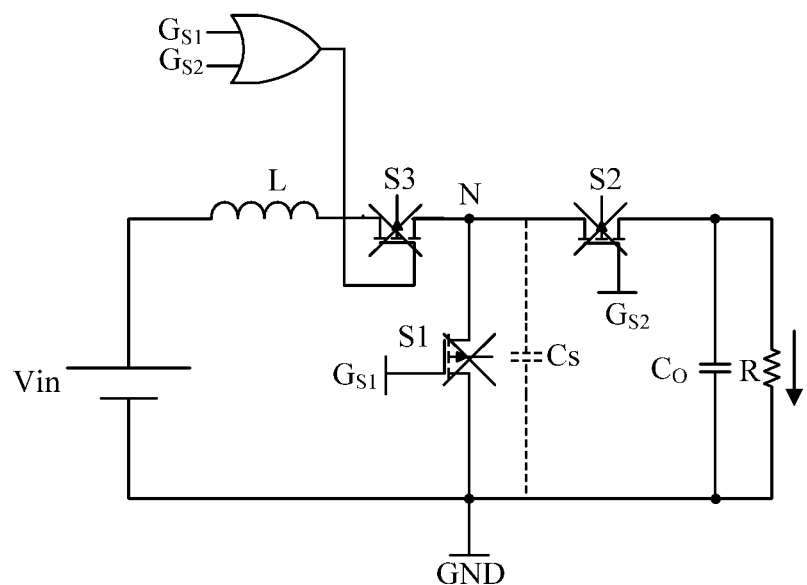
FIG. 8A is an operating state diagram of the third stage of the booster circuit provided in FIG. 4.
Figure 8B:
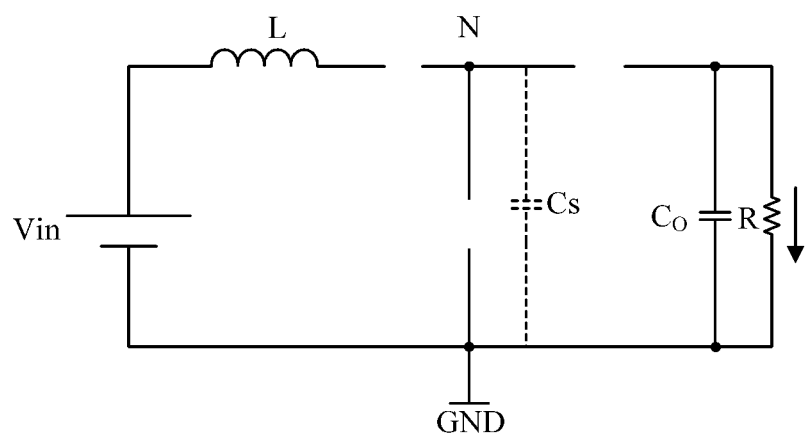
FIG. 8B is an equivalent circuit diagram corresponding to FIG. 8A.
Figure 9:
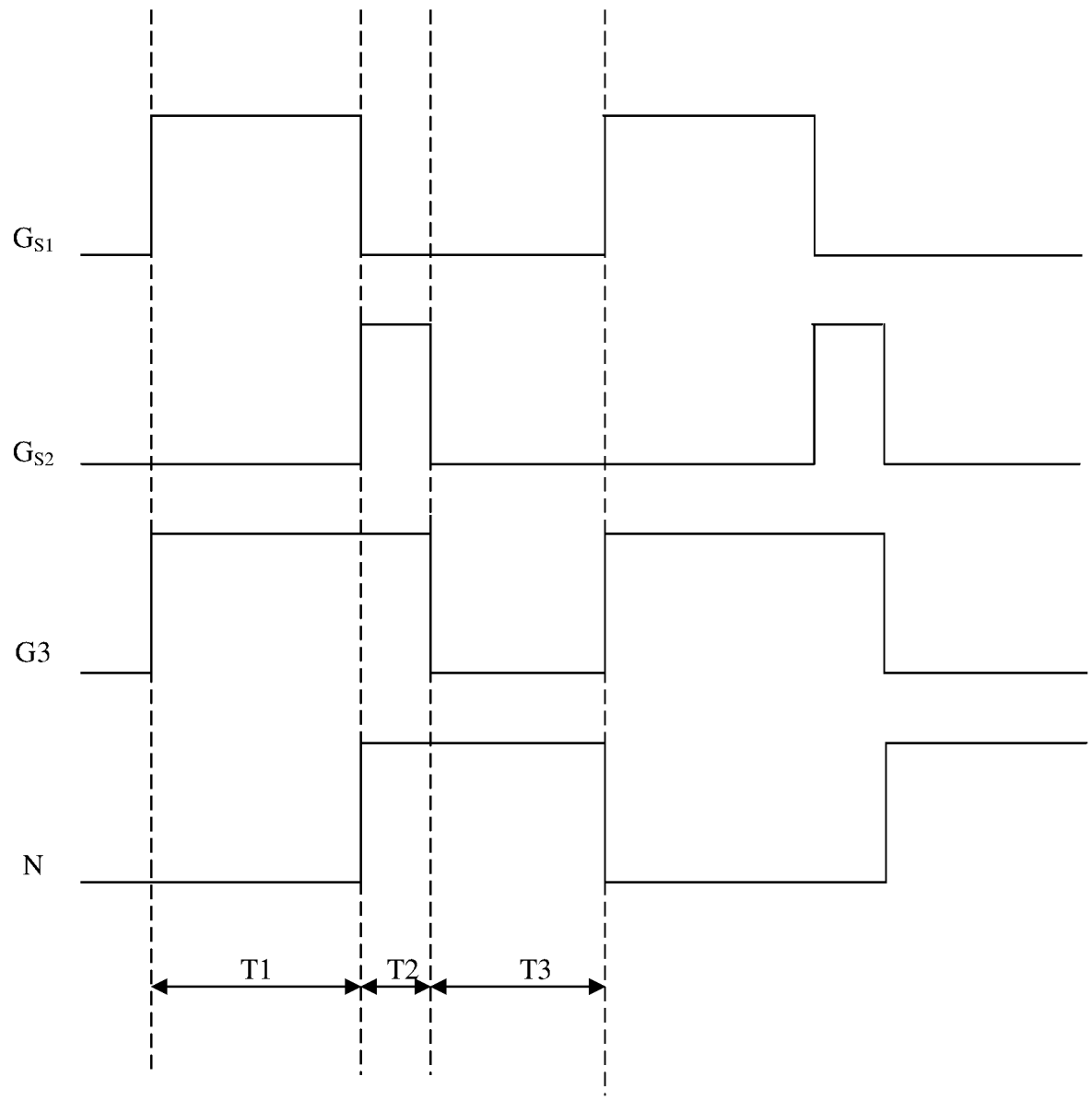
FIG. 9 is an operating timing diagram of the booster circuit provided in FIG. 4.

It is taken as an example in which the switches S1 to S3 in the booster circuit provided in FIG. 4 are all N-type thin film transistors. FIG. 6A is an operating state diagram of the first stage of the booster circuit provided in FIG. 4; FIG. 6B is an equivalent circuit diagram corresponding to FIG. 6A; FIG. 7A is an operating state diagram of the second stage of the booster circuit provided in FIG. 4; FIG. 7B is an equivalent circuit diagram corresponding to FIG. 7A; FIG. 8A is an operating state diagram of the third stage of the booster circuit provided in FIG. 4; FIG. 8B is an equivalent circuit diagram corresponding to FIG. 8A; FIG. 9 is an operating timing diagram of the booster circuit provided in FIG. 4. As shown in FIGS. 4 and 6-9, the booster circuit according to the embodiment of the present disclosure includes one power supply (Vin), 3 switches (S1 to S3), 1 capacitor ($C_O$), 2 signal input terminals ($G_{S1}$ and $G_{S2}$) and 1 ground terminal (GND).

It should be noted that the signal G3 in FIG. 9 represents a signal for controlling the on or off of the third switch S3, and the signal G3 is determined by the NOR result of the input signals of the first control terminal $G_{S1}$ and the second control terminal $G_{S2}$.

The operating principle of the booster circuit provided in FIG. 4 is as follows.

At the first stage T1, that is, the charging stage, as shown in FIGS. 6A and 6B, the input signal of the first control terminal $G_{S1}$ is a high-level signal, the first switch S1 is turned on, and the third switch S3 is also turned on, the input signal of the second control terminal $G_{S2}$ is a low-level signal, and the second switch S2 is turned off. The power supply element Vin—the inductor L—the third switch S3—the first switch S1 forms a loop, the power supply element Vin charges the inductor L, and the output capacitor $C_O$ supplies power to the load R. At this time, since the connection node N is connected to the ground terminal GND, the voltage at the connection node N is 0V.

In this stage, the input signal of the first control terminal $G_{S1}$ is a high-level signal, and the input signal of the second control terminal $G_{S2}$ is a low-level signal. The second switch S2 is used to prevent the output capacitor $C_O$ from discharging to the ground terminal GND in this stage.

At the second stage T2, that is, the discharging stage, as shown in FIGS. 7A and 7B, the input signal of the first control terminal $G_{S1}$ is a low-level signal, the first switch S1 is turned off, and the input signal of the second control terminal $G_{S2}$ is a high-level signal, the second switch S2 is turned on, and the third switch S3 is also turned on. The power supply element Vin—the inductor L—the third switch S3—the second switch S2—the load R forms a loop, and the inductor L discharges. At this time, the voltage at the connection node N is Vout.

In this stage, the input signal of the first control terminal $G_{S1}$ is a low-level signal, and the input signal of the second control terminal $G_{S2}$ is a high-level signal. It should be noted that, during the discharging process, due to the current holding characteristic of the inductor L, the current flowing through the inductor L does not immediately become 0, but slowly changes from the value at the end of charging to 0.

At the third phase T3, that is, the blocking phase, as shown in FIGS. 8A and 8B, the input signal of the first control terminal $G_{S1}$ is a low-level signal, the first switch S1 is turned off, and the input signal of the second control terminal $G_{S2}$ is a low-level signal, the second switch S2 is turned off, and the third switch S3 is also turned off. Since the energy release of the inductor L completes at the end of the second stage T2, the voltage across the parasitic capacitance Cs at this time is higher than the voltage provided from the power supply element Vin. However, since the third switch S3 is turned off, the parasitic capacitance Cs—the inductor L—the power supply element Vin cannot form a loop, so that the parasitic capacitance Cs cannot release energy to the power supply element Vin, and the current generated when the parasitic capacitance Cs discharges does not flow through the inductor L. The output capacitor $C_O$ supplies power to the load R until the next cycle comes, in which the first switch S1 is turned on and the parasitic capacitor Cs releases energy.

In this stage, the input signals of the first control terminal $G_{S1}$ and the second control terminal $G_{S2}$ both are low-level signals.

It can be known from the above analysis that the embodiment of the present disclosure adds a third switch S3 between the connection node N and the inductor L, and controls the operating timing of the third switch S3 to prevent the current generated when the parasitic capacitance Cs discharges from flowing to the inductor L. Thus, it can prevent the oscillation between the parasitic capacitance Cs and the inductor L, avoid causing a large electromagnetic interference, and then reduce the adverse effects caused by the electromagnetic interference.

Optionally, as another implementation of the embodiment of the present disclosure, FIG. 5 is another equivalent circuit diagram of a booster circuit according to the embodiment of the present disclosure. As shown in FIG. 5, the oscillation elimination sub-circuit includes a thyristor S.

Specifically, the gate of the thyristor S is connected to the third control terminal $G_{S3}$, the anode of the thyristor S is connected to the connection node N and the second terminal of the inductor L, and the cathode of the thyristor S is connected to the first terminal of the inductor L. That is, the thyristor S and the inductor L are disposed in parallel.

Optionally, when a falling edge of the input signal of the second control terminal $G_{S2}$ is detected, the input signal of the third control terminal $G_{S3}$ turns the thyristor S on.

Specifically, the third control terminal $G_{S3}$> is connected to the timing driving chip, and the timing driving chip is also configured to provide the third control terminal $G_{S3}$ with a signal for turning the thyristor S on or off.

Specifically, the thyristor S has the following characteristics: when the thyristor S is subjected to a reverse voltage, the thyristor S will not be turned on regardless of whether there is a trigger current at the gate; when the thyristor S is subjected to a forward voltage, the thyristor S may turn on only when there is a trigger current at the gate; once the thyristor S turns on, the gate loses the control, and the thyristor S is kept on regardless of whether the trigger current at the gate is present; the thyristor S that has turned on can only turn off by reducing the current flowing through the thyristor S to a certain value close to zero using an external applied voltage and an external circuit. It should be noted that the forward voltage means that the voltage of the anode is higher than the voltage of the cathode, and the reverse voltage means that the voltage of the anode is lower than the voltage of the cathode.

Each of the switches S1 to S2 in the booster circuit shown in FIG. 5 may be an N-type thin film transistor or a P-type thin film transistor. This can facilitate uniformity of the process flow, simplify the technological process, and help improve the yield of the product.

The technical solution of the embodiment of the present disclosure is further described below in conjunction with the operating process of the booster circuit.

Figure 10A:
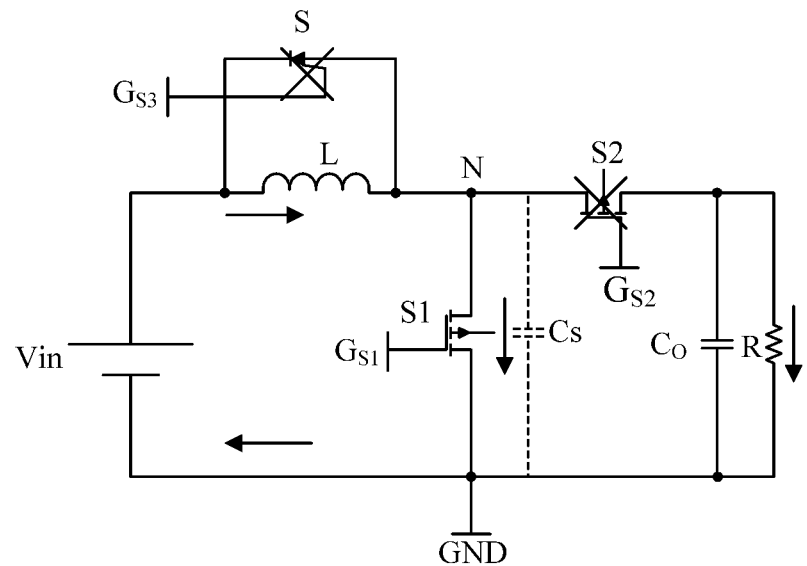
FIG. 10A is an operating state diagram of the first stage of the booster circuit provided in FIG. 5.
Figure 10B:
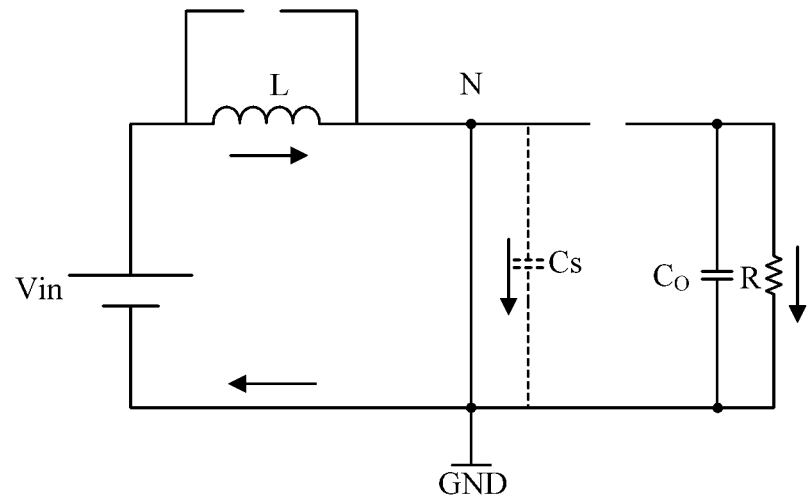
FIG. 10B is an equivalent circuit diagram corresponding to FIG. 10A.
Figure 11A:
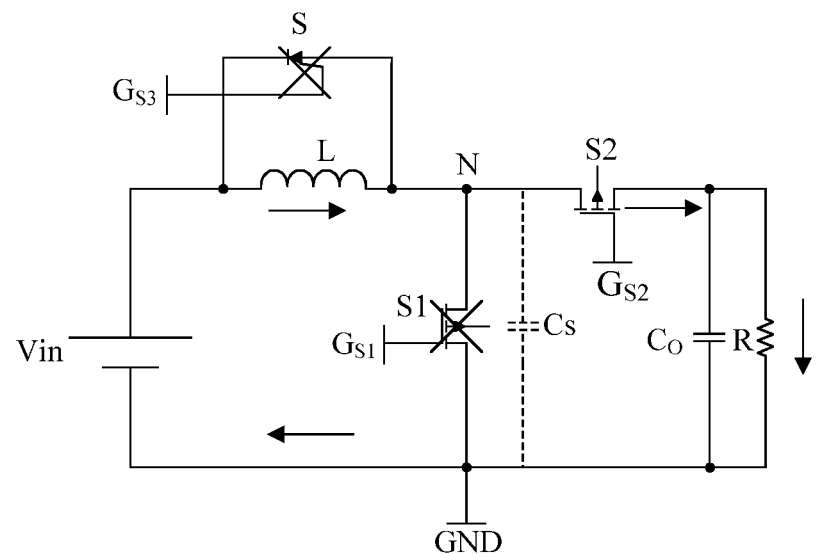
FIG. 11A is an operating state diagram of the second stage of the booster circuit provided in FIG. 5.
Figure 11B:
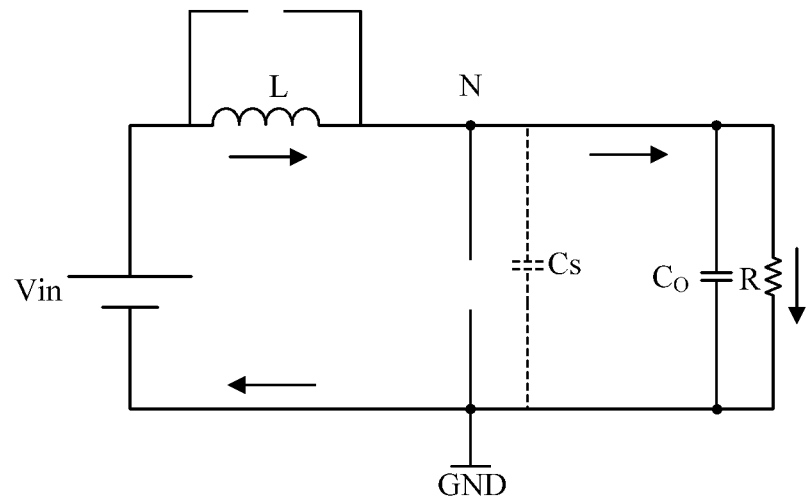
FIG. 11B is an equivalent circuit diagram corresponding to FIG. 11A.
Figure 12A:
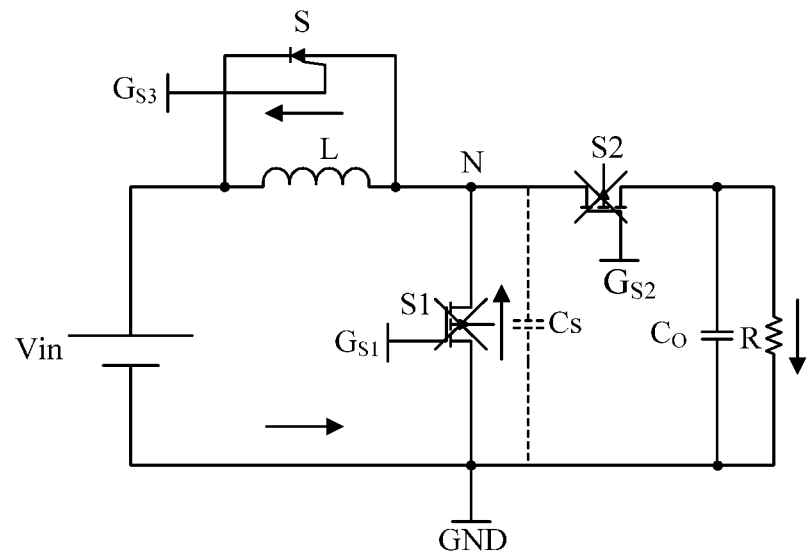
FIG. 12A is an operating state diagram of the third stage of the booster circuit provided in FIG. 5.
Figure 12B:
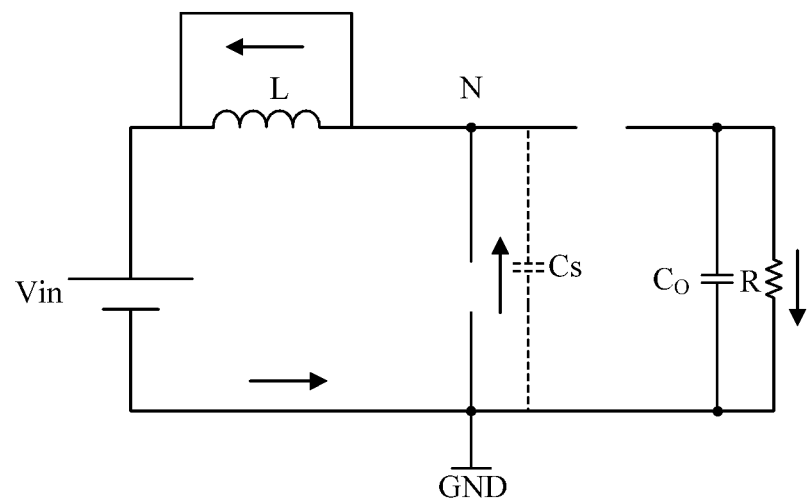
FIG. 12B is an equivalent circuit diagram corresponding to FIG. 12A.
Figure 13A:
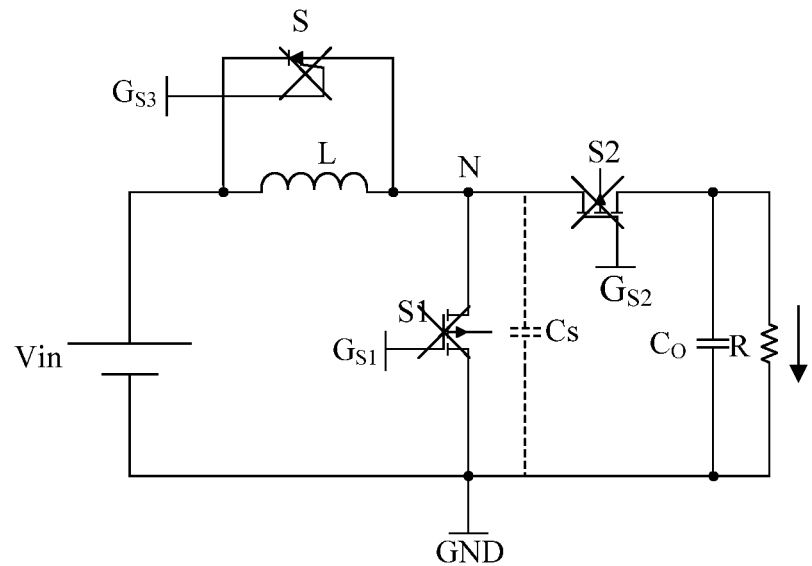
FIG. 13A is an operating state diagram of the fourth stage of the booster circuit provided in FIG. 5.
Figure 13B:
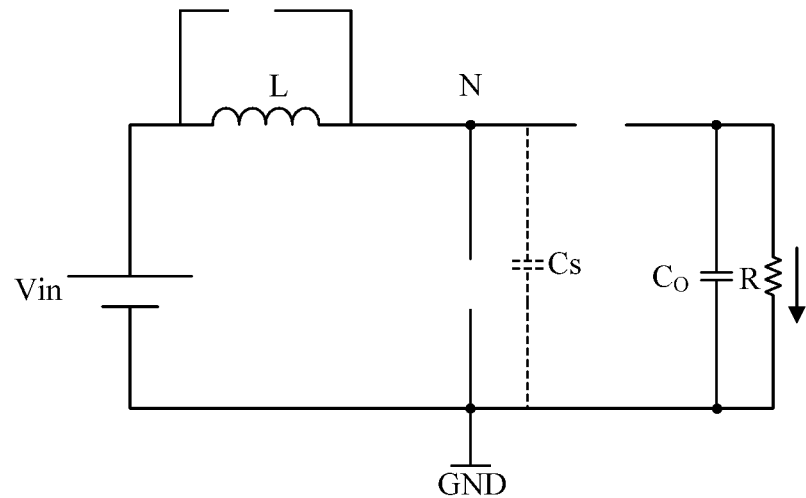
FIG. 13B is an equivalent circuit diagram corresponding to FIG. 13A.
Figure 14:
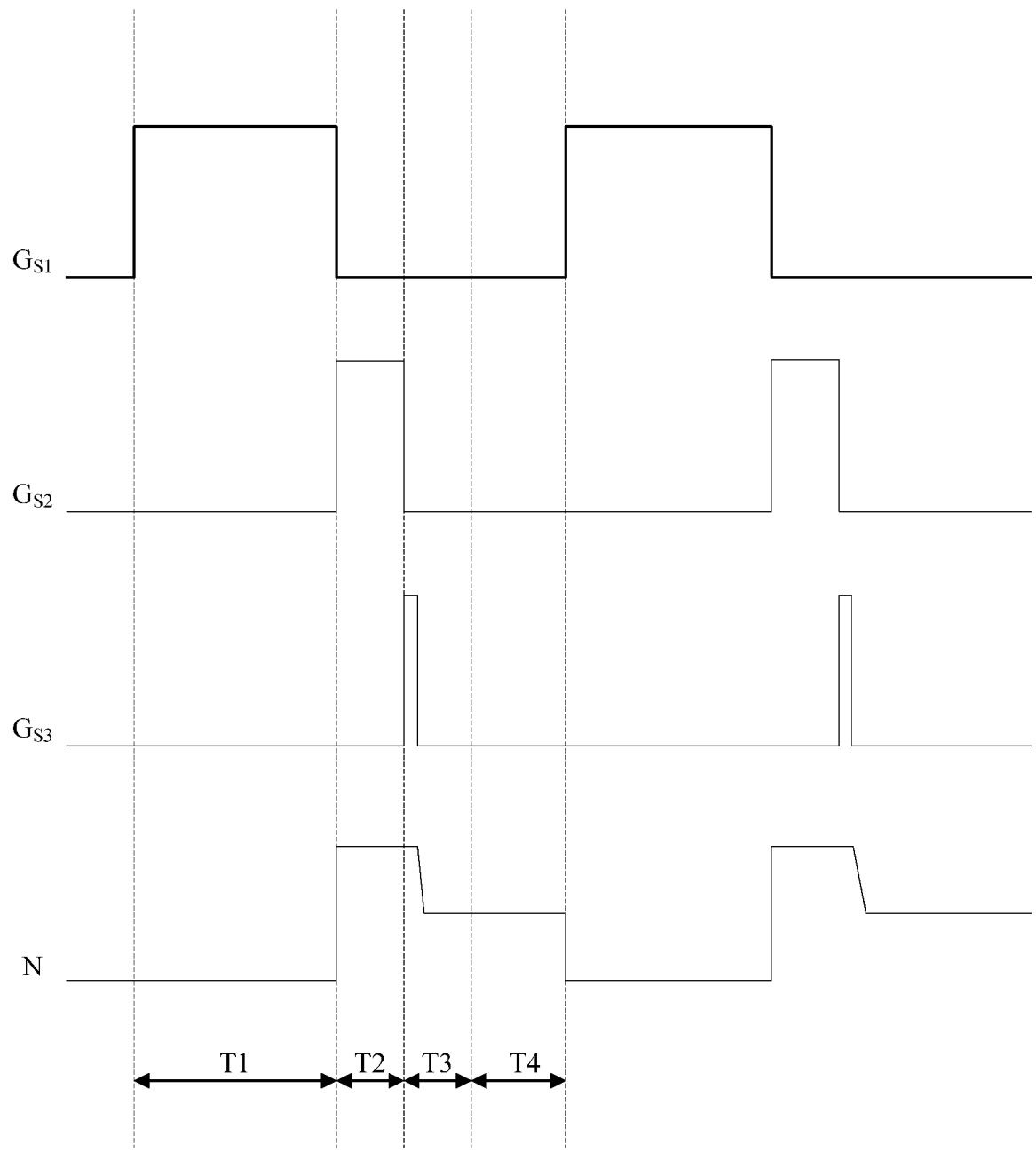
FIG. 14 is an operating timing diagram of the booster circuit provided in FIG. 5.

It is taken as an example in which the switches S1 to S2 in the booster circuit provided in FIG. 5 are all N-type thin film transistors. FIG. 10A is an operating state diagram of the first stage of the booster circuit provided in FIG. 5; FIG. 10B is an equivalent circuit diagram corresponding to FIG. 10A; FIG. 11A is an operating state diagram of the second stage of the booster circuit provided in FIG. 5; FIG. 11B is an equivalent circuit diagram corresponding to FIG. 11A; FIG. 12A is an operating state diagram of the third stage of the booster circuit provided in FIG. 5; FIG. 12B is an equivalent circuit diagram corresponding to FIG. 12A; FIG. 13A is an operating state diagram of the fourth stage of the booster circuit provided in FIG. 5; FIG. 13B is an equivalent circuit diagram corresponding to FIG. 13A; FIG. 14 is an operating timing diagram of the booster circuit provided in FIG. 5. As shown in FIGS. 5 and 10~14, the booster circuit according to the embodiment of the present disclosure includes a power supply element (Vin), two switches (S1 to S2), a thyristor (S), a capacitor ($C_O$), three signal input terminals ($G_{S1}$, $G_{S2}$ and $G_{S3}$) and a ground terminal (GND).

The operating principle of the booster circuit provided in FIG. 5 is as follows.

At the first stage T1, that is, the charging stage, as shown in FIGS. 10A and 10B, the input signal of the first control terminal $G_{S1}$ is a high-level signal, the first switch S1 is turned on, the input signal of the second control terminal $G_{S2}$ is a low-level signal, and the second switch S2 is turned off. The power supply element Vin—the inductor L—the third switch S3—the first switch S1 forms a loop, the power supply element Vin charges the inductor L, and the output capacitor $C_O$ supplies power to the load R. At this time, since the connection node N is connected to the ground terminal, the voltage at the connection node N is 0V. At this stage, the thyristor S is subjected to a reverse voltage and turns off.

In this stage, the input signal of the first control terminal $G_{S1}$ is a high-level signal, and the input signal of the second control terminal $G_{S2}$ is a low-level signal. Since the thyristor S is subjected to a reverse voltage at this stage, the input signal of the third control terminal $G_{S3}$ is not limited. The second switch S2 is used to prevent the output capacitor $C_O$ from discharging to the ground terminal GND in this stage.

At the second stage T2, that is, the discharging stage, as shown in FIGS. 11A and 11B, the input signal of the first control terminal $G_{S1}$ is a low-level signal, the first switch S1 is turned off, and the input signal of the second control terminal $G_{S2}$ is a high-level signal, the second switch S2 is turned on. The power supply element Vin—the inductor L—the third switch S3—the second switch S2—the load R forms a loop, and the inductor L discharges. At this time, the voltage at the connection node N is Vout. At this stage, the thyristor S is still subjected to a reverse voltage, and is still in the off state.

In this stage, the input signal of the first control terminal $G_{S1}$ is a low-level signal, and the input signal of the second control terminal $G_{S2}$ is a high-level signal. Since the thyristor S is subjected to a reverse voltage at this stage, the input signal of the third control terminal $G_{S3}$ is not limited. It should be noted that, during the discharging process, due to the current holding characteristic of the inductor L, the current flowing through the inductor L does not immediately become 0, but slowly changes from the value at the end of charging to 0.

At the third stage T3, as shown in FIGS. 12A and 12B, the input signal of the first control terminal $G_{S1}$ is a low-level signal, the first switch S1 is turned off, and the input signal of the second control terminal $G_{S2}$ is a low-level signal, the second switch S2 is turned off. At this time, when a falling edge of the input signal of the second control terminal $G_{S2}$ is detected, the input signal of the third control terminal $G_{S3}$ is a high-level signal, and the thyristor S turns on. In order to save energy, after a period of time, the input signal of the third control terminal $G_{S3}$ becomes a low-level signal. Due to the characteristics of the thyristor S, the thyristor S continues to maintain a conductive state at this time. The parasitic capacitance Cs releases energy to the power supply element Vin through the thyristor S until the voltage across the parasitic capacitance Cs is equal to the voltage provided from the power supply element Vin. At this time, the current flowing through the thyristor S approaches zero and the thyristor S turns off.

In this stage, the input signals of the first control terminal $G_{S1}$ and the second control terminal $G_{S2}$ both are low-level signals, and the input signal of the third control terminal $G_{S3}$ is a high-level signal first and then a low-level signal.

At the fourth stage T4, as shown in FIGS. 13A and 13B, the input signal of the first control terminal $G_{S1}$ is a low-level signal, the first switch S1 is turned off, and the input signal of the second control terminal $G_{S2}$ is a low-level signal, the second switch S2 is turned off, and the thyristor S remains in the off state. The output capacitor $C_O$ supplies power to the load R until the next cycle comes, in which the first switch S1 is turned on again.

It can be known from the above analysis that the embodiment of the present disclosure adds a thyristor S to the booster circuit, and controls the on and off of the thyristor S through the input signal of the third control terminal $G_{S3}$, so that the current generated when the parasitic capacitance Cs discharges flows to the power supply element Vin through the thyristor S without passing through the inductor L. This can prevent an oscillation between the parasitic capacitance Cs and the inductor L, avoid causing a large electromagnetic interference, and thereby reduce the adverse effects caused by the electromagnetic interference. When the falling edge of the input signal of the second control terminal $G_{S2}$ is detected, the input signal of the third control terminal $G_{S3}$ turns the thyristor S on. Due to the characteristics of the thyristor S, when the voltage of the input signal of the third control terminal $G_{S3}$ decreases, the thyristor S does not turn off like a MOSFET, but keeps turning on until the current flowing through it is zero.

The oscillation elimination sub-circuit according to the embodiment of the present disclosure not only has a simple control algorithm, but also is easy to implement.

Figure 15:
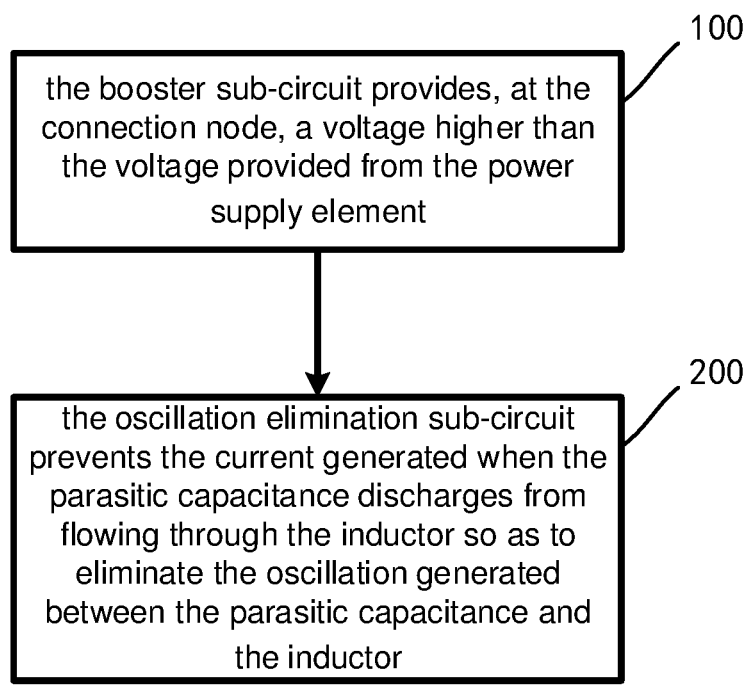
FIG. 15 is a flow chart of a driving method of a booster circuit according to an embodiment of the present disclosure

Based on the concept of the above embodiments, the embodiments of the present disclosure also provide a driving method of the booster circuit. The method is applied to the booster circuit according to the embodiments of the present disclosure. FIG. 15 is a flow chart of a driving method of a booster circuit according to an embodiment of the present disclosure. As shown in FIG. 15, the driving method specifically includes the following steps.

At Step 100, the booster sub-circuit provides, at the connection node, a voltage higher than the voltage provided from the power supply element.

At Step 200, the oscillation elimination sub-circuit prevents the current generated when the parasitic capacitance discharges from flowing through the inductor so as to eliminate the oscillation generated between the parasitic capacitance and the inductor.

In the embodiment of the present disclosure, by providing an oscillation elimination sub-circuit in the booster circuit, it can prevent the current generated when the parasitic capacitance discharges from flowing through the inductor, eliminating the oscillation between the parasitic capacitance and the inductor, and avoiding causing a large electromagnetic interference, thereby reducing adverse effects caused by the electromagnetic interference on the liquid crystal display panel.

Optionally, as an embodiment, when the driving method of the booster circuit is applied to the booster circuit provided in FIG. 4, Step 100 includes: providing, by for example, the timing driving chip, the first control terminal with a signal for turning the first switch on, and providing the second control terminal with a signal for turning the second switch off at the same time, to turn the first switch on and turn the second switch off, the power supply element charging the inductor, and the output capacitor supplying power to the load; then, providing, by for example, the timing driving chip, the first control terminal with a signal for turning the first switch off, and providing the second control terminal with a signal for turning the second switch on at the same time, to turn the first switch off and turn the second switch on, and the inductor supplying power to the load.

Step 200 includes: providing, by for example, the timing driving chip, the first control terminal with a signal for turning the first switch off, and providing the second control terminal with a signal for turning the second switch off at the same time, to turn the first switch and the second switch off, and the output capacitor supplying power to the load.

Optionally, as another implementation, when the driving method of the booster circuit is applied to the booster circuit provided in FIG. 5, step 100 includes: providing, by for example, the timing driving chip, the first control terminal with a signal for turning the first switch on, providing the second control terminal with a signal for turning the second switch off, to turn the first switch on and turn the second switch off, the power supply element charging the inductor, and the output capacitor supplying power to the load; then, providing, by for example, the timing driving chip, the first control terminal with a signal for turning the first switch off, providing the second control terminal with a signal for turning the second switch on, to turn the first switch off and turn the second switch on, and the inductor supplying power to the load.

Step 200 includes: providing, by for example, the timing driving chip, the first control terminal with a signal for turning the first switch off, providing the second control terminal with a signal for turning the second switch off, and providing the third control terminal with a signal for turning the thyristor on at the same time, to turn the first switch and the second switch off and turn the thyristor on, the output capacitor supplying power to the load, and the parasitic capacitance discharging to the power supply component through the thyristor until the thyristor turns off; then, providing, by for example, the timing driving chip, the first control terminal with a signal for turning the first switch off, providing the second control terminal with a signal for turning the second switch off, to turn the first switch and the second switch off, and the output capacitor supplying power to the load.

Based on the inventive concept of the above embodiment, an embodiment of the present application further provides a backlight module, including a booster circuit.

The booster circuit is a booster circuit according to an embodiment of the present application, and its implementation principle and implementation effect are the same as those described above, which will not be repeated here.

Figure 17:
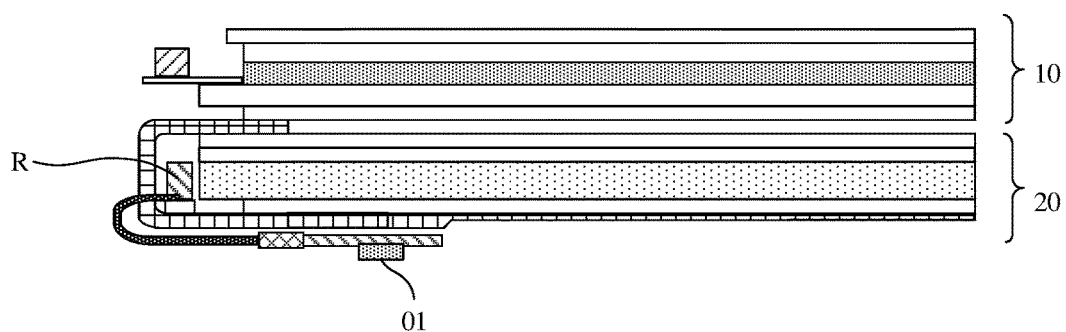
FIG. 17 shows a schematic diagram of a display device according to an embodiment of the present application.

Based on the inventive concepts of the foregoing embodiments, as shown in FIG. 17, embodiments of the present disclosure further provide a display device 1000, including a display panel 10 and a backlight module 20 according to the embodiments of the present disclosure.

The backlight module 20 is configured to provide a backlight source for the display panel 10.

Specifically, the display device 1000 may be any product or component with a display function such as a mobile phone, a tablet computer, a TV, a display, a notebook computer, a digital photo frame, a navigator, and the like, which is not limited in the embodiments of the present disclosure.

It should be noted that the display device provided in the embodiments of the present disclosure may be twisted nematic (TN) mode, vertical alignment (VA) mode, in-plane switching (IPS) mode or Advanced Super Dimension Switch (ADS) mode, which is not limited in the embodiments of the present disclosure.

The drawings in the embodiments of the present disclosure relate only to the structures involved in the embodiments of the present disclosure, and other structures may refer to the general design.

In the case of no conflict, the embodiments, that is, the features in the embodiments, of the present disclosure, can be combined with each other to obtain a new embodiment.

Although the implementations disclosed in the embodiments of the present disclosure are as described above, the described contents are only implementations adopted to facilitate understanding of the embodiments of the present disclosure, and are not intended to limit the embodiments of the present disclosure. Any person skilled in the art to which the embodiments of the present disclosure belong can make any modifications and changes in the implementation form and details without departing from the spirit and scope disclosed in the embodiments of the present disclosure. However, the patent protection scope of the embodiments of this disclosure must still be subject to the scope defined by the appended claims.

We claim:

1. A booster circuit, comprising: a booster sub-circuit and an oscillation elimination sub-circuit; wherein:

the booster sub-circuit comprises a power supply element, an inductor, and a first switch;

a first terminal of the power supply element is connected to a first terminal of the inductor, and a second terminal of the power supply element is connected to a ground terminal;

a second terminal of the inductor is connected to the oscillation elimination sub-circuit;

a first electrode of the first switch is connected to a connection node, a second electrode of the first switch is connected to the ground terminal, and the booster sub-circuit is configured to provide, at the connection node, a voltage higher than a voltage provided from the power supply element;

a parasitic capacitance occurs between the connection node and the ground terminal;

the oscillation elimination sub-circuit is connected to the second terminal of the inductor and the connection node, and is configured to prevent a current generated when the parasitic capacitance discharges from flowing through the inductor so as to eliminate an oscillation generated between the parasitic capacitance and the inductor;

the booster sub-circuit further comprises: a second switch, an output capacitor and a load;

a control electrode of the first switch is connected to a first control terminal;

a control electrode of the second switch is connected to a second control terminal, a first electrode of the second switch is connected to the connection node, and a second electrode of the second switch is connected to a first terminal of the output capacitor;

the first terminal of the output capacitor is connected to a first terminal of the load, and a second terminal of the output capacitor is connected to the ground terminal;

a second terminal of the load is connected to the ground terminal;

the oscillation elimination sub-circuit comprises: a NOR gate and a third switch;

a first input terminal of the NOR gate is connected to the first control terminal, a second input terminal of the NOR gate is connected to the second control terminal, and an output terminal of the NOR gate is connected to a control electrode of the third switch; and a first electrode of the third switch is connected to the second terminal of the inductor, and a second electrode of the third switch is connected to the connection node.

2. The booster circuit according to claim 1, wherein the third switch turns on when the first switch is turned on and/or the second switch is turned on.

3. The booster circuit according to claim 1, wherein the first control terminal and the second control terminal are connected to a timing driving chip; and wherein the timing driving chip is configured to provide the first control terminal with a signal for turning the first switch on or off, and also configured to provide the second control terminal with a signal for turning the second switch on or off.

4. A display device comprising a backlight module connected to the booster circuit according to claim 1.

5. A driving method of a booster circuit, wherein the booster circuit comprises a booster sub-circuit and an oscillation elimination sub-circuit, wherein:

the booster sub-circuit comprises a power supply element, an inductor, and a first switch;

a first terminal of the power supply element is connected to a first terminal of the inductor, and a second terminal of the power supply element is connected to a ground terminal;

a second terminal of the inductor is connected to the oscillation elimination sub-circuit;

a first electrode of the first switch is connected to a connection node, a second electrode of the first switch is connected to the ground terminal, and the booster sub-circuit is configured to provide, at the connection node, a voltage higher than a voltage provided from the power supply element;

a parasitic capacitance occurs between the connection node and the ground terminal;

the oscillation elimination sub-circuit is connected to the second terminal of the inductor and the connection node, and is configured to prevent a current generated when the parasitic capacitance discharges from flowing through the inductor so as to eliminate an oscillation generated between the parasitic capacitance and the inductor;

the booster sub-circuit further comprises: a second switch, an output capacitor and a load;

a control electrode of the first switch is connected to a first control terminal;

a control electrode of the second switch is connected to a second control terminal, a first electrode of the second switch is connected to the connection node, and a second electrode of the second switch is connected to a first terminal of the output capacitor;

the first terminal of the output capacitor is connected to a first terminal of the load, and a second terminal of the output capacitor is connected to the ground terminal;

a second terminal of the load is connected to the ground terminal;

the oscillation elimination sub-circuit comprises: a NOR gate and a third switch;

a first input terminal of the NOR gate is connected to the first control terminal, a second input terminal of the NOR gate is connected to the second control terminal, and an output terminal of the NOR gate is connected to a control electrode of the third switch; and a first electrode of the third switch is connected to the second terminal of the inductor, and a second electrode of the third switch is connected to the connection node;

the method comprising:

providing at the connection node, by the booster sub-circuit, a voltage higher than a voltage provided from the power supply element; and preventing, by the oscillation elimination sub-circuit, a current generated when the parasitic capacitance discharges from flowing through the inductor so as to eliminate an oscillation generated between the parasitic capacitance and the inductor, wherein the providing at the connection node, by the booster sub-circuit, a voltage higher than a voltage provided from the power supply element comprises:

providing the first control terminal with a signal for turning the first switch on, and providing the second control terminal with a signal for turning the second switch off at the same time, to turn the first switch on and turn the second switch off, charging the inductor by the power supply element, and supplying power to the load by the output capacitor; and then, providing the first control terminal with a signal for turning the first switch off, and providing the second control terminal with a signal for turning the second switch on at the same time, to turn the first switch off and turn the second switch on, and supplying power to the load by the inductor; and wherein the preventing, by the oscillation elimination sub-circuit, a current generated when the parasitic capacitance discharges from flowing through the inductor so as to eliminate an oscillation generated between the parasitic capacitance and the inductor comprises:

providing the first control terminal with a signal for turning the first switch off, and providing the second control terminal with a signal for turning the second switch off at the same time, to turn the first switch and the second switch off, and supplying power to the load by the output capacitor.

\* \* \* \* \*